(12) United States Patent
Westland et al.

(10) Patent No.: US 8,435,345 B2
(45) Date of Patent: May 7, 2013

(54) INTERNALLY CURING CEMENT BASED MATERIALS

(75) Inventors: John A. Westland, Auburn, WA (US); David J. O'Callaghan, Bonney Lake, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 0 days.

(21) Appl. No.: 12/892,239

(22) Filed: Sep. 28, 2010

(65) Prior Publication Data

US 2011/0073015 A1    Mar. 31, 2011

Related U.S. Application Data

(60) Provisional application No. 61/247,460, filed on Sep. 30, 2009.

(51) Int. Cl.
| | |
|---|---|
| *C04B 28/14* | (2006.01) |
| *C04B 40/00* | (2006.01) |
| *C04B 9/04* | (2006.01) |
| *D21F 11/00* | (2006.01) |
| *D21H 11/00* | (2006.01) |
| *D21H 13/00* | (2006.01) |
| *D21H 15/00* | (2006.01) |
| *D21H 17/00* | (2006.01) |
| *D21H 19/00* | (2006.01) |
| *D21H 21/00* | (2006.01) |
| *D21H 23/00* | (2006.01) |
| *D21H 25/00* | (2006.01) |
| *D21C 9/00* | (2006.01) |

(52) U.S. Cl.
USPC ............... 106/805; 106/780; 106/820; 162/9; 162/157.6; 162/182

(58) Field of Classification Search .................... None
See application file for complete search history.

(56) References Cited

U.S. PATENT DOCUMENTS

| | | | | |
|---|---|---|---|---|
| 2,322,194 | A * | 6/1943 | King ............................... | 106/646 |
| 6,379,494 | B1 | 4/2002 | Jewell et al. | |
| 6,524,348 | B1 | 2/2003 | Jewell et al. | |
| 6,627,750 | B2 * | 9/2003 | Wang .............................. | 536/63 |
| 6,821,383 | B2 * | 11/2004 | Shore et al. ....................... | 162/9 |
| 2004/0092625 | A1 | 5/2004 | Pollock et al. | |
| 2006/0147681 | A1 | 7/2006 | Dubey | |
| 2007/0089645 | A1 * | 4/2007 | Morton et al. ................ | 106/805 |
| 2007/0246857 | A1 * | 10/2007 | Kurtis et al. .................. | 264/236 |
| 2008/0178769 | A1 | 7/2008 | Goodwin et al. | |

OTHER PUBLICATIONS

"The Effects of Aggregates Characteristics on the Performance of Portland Cement Concrete", Aug. 2004 [Retrieved Dec. 29, 2011]. Retrieved from http://www.icar.utexas.edu/publications/104_1F. pdf.*

* cited by examiner

*Primary Examiner* — Kaj K Olsen
*Assistant Examiner* — Karam Hijji
(74) *Attorney, Agent, or Firm* — Christensen O'Connor Johnson Kindness PLLC

(57) ABSTRACT

A method of curing cementitious material comprising added a carboxylated bleached wood pulp fiber to the material during mixing. The fiber has a carboxyl content of from 10 to 70 meq/100 g cellulose fiber. The fibers are 0.1 to 5% by weight of the dry weight of the cementitious material. The structure produced by the method. The autogenous shrinkage of the cementitious material is reduced.

10 Claims, 6 Drawing Sheets

INTERNALLY CURING CEMENT BASED MATERIALS

This application claims priority under 35 U.S.C. §119, based on U.S. Provisional Application Ser. No. 61/247,460 filed Sep. 30, 2009.

FIELD OF THE INVENTION

The present invention relates generally to methods of and materials for internal curing cement-based materials and the resultant product.

BACKGROUND OF THE INVENTION

Modern day construction uses concrete in many forms from conventional concrete to high performance concrete. The type of concrete used will depend upon its use and the strength required. Conventional concrete has strengths in the range of 30 to 50 megaPascals (MPa). High performance concrete has strengths in the range of 200 to 400 MPa. Water usage also varies in the concretes. Conventional concrete has a water to cement material ratio (w/cm) of 0.4 to 0.6. High performance concrete has a water to cement material ratio of 0.2 to 0.3. This is because of the additives in high performance concrete. Low water to cement ratios impart high strength to the concrete.

This low water to cement material ratio leads to a concern about autogenous shrinkage. Autogenous shrinkage is internal shrinkage. A cement or concrete structure has less volume than the original water and cement material elements. As it cures it contracts. In the early curing stages of a cement or concrete structure the cement or concrete is fluid and can contract. As the cement or concrete sets up and solidifies its ability to contract diminishes. A lack of water in the internal portion of a cement or concrete structure leads to internal or autogenous shrinkage without the contraction of the entire structure. This leads to cracks and inadequate curing or strength development. As the structure solidifies there is no way to supply water to the internal portion from the outside.

There is a need to provide water to the internal portion of a cement or concrete structure to avoid internal or autogenous shrinkage.

There is also a need to provide this water while maintaining the initial consistency of the cement water mix, keeping the initial setting time within specifications and keeping the final setting time within normal limits.

DETAILED DESCRIPTION OF THE INVENTION

The present invention proposes to place a water containing material within the cement or concrete structure. This material will provide water to the cement or concrete during its curing cycle.

The material is a bleached cellulose wood pulp fiber which has been treated to bind up and release the water in the cement in a controlled manner. The bleached cellulose wood pulp fiber is a carboxylated cellulose wood pulp fiber. Bleached cellulose wood pulp fibers typically have a carboxyl content of 5 or below milliequivalents per 100 g of cellulose fiber (meq/100 g). The fiber is treated to provide additional carboxylation to the cellulose wood pulp fiber. In one embodiment the cellulose wood pulp fiber has a total carboxyl content of 10 to 70 meq/100 g. In another embodiment the cellulose wood pulp fiber has a total carboxyl content of 10 to 50 meq/100 g. In another embodiment the cellulose wood pulp fiber has a total carboxyl content of 20 to 40 meq/100 g. In another embodiment the cellulose wood pulp fiber has a total carboxyl content of 25 to 30 meq/100 g.

Figure 4:
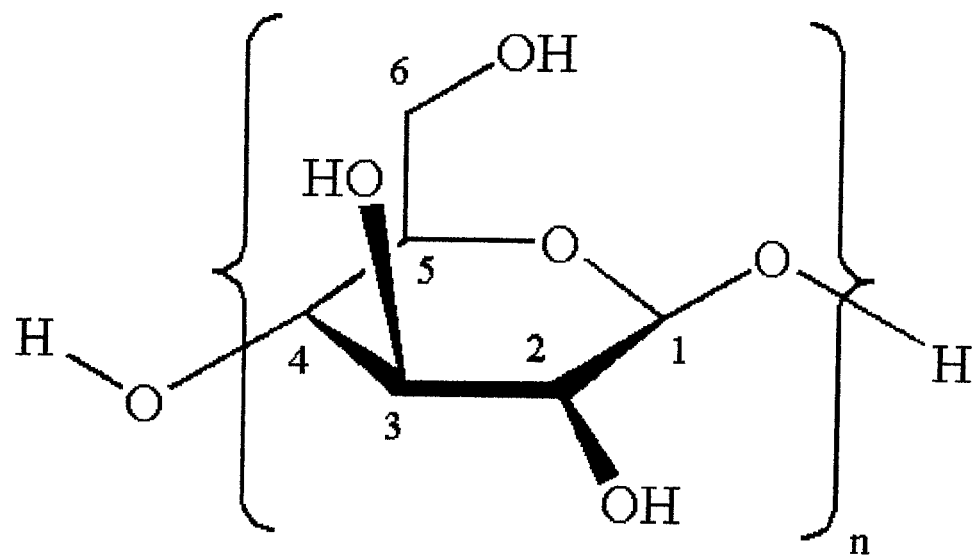
FIG. 4 is a representation of one unit of a cellulose molecule.

Cellulose is a carbohydrate consisting of a long chain of glucose units, all β-linked through the 1-4 positions. The structure of cellulose is shown in FIG. 4. Native plant cellulose molecules may have upwards of 2200 of the anhydroglucose units shown in FIG. 4. The number of units is normally referred to as degree of polymerization or simply D.P. Some loss of D.P. occurs during purification of the cellulose, as in using a chemical pulping process to pulp the wood to obtain the cellulose and separate it from the lignin and some of the hemicellulose in the wood. The D.P. of the final pulp will depend upon the pulping process used and the test to determine the D.P.

Figure 5:
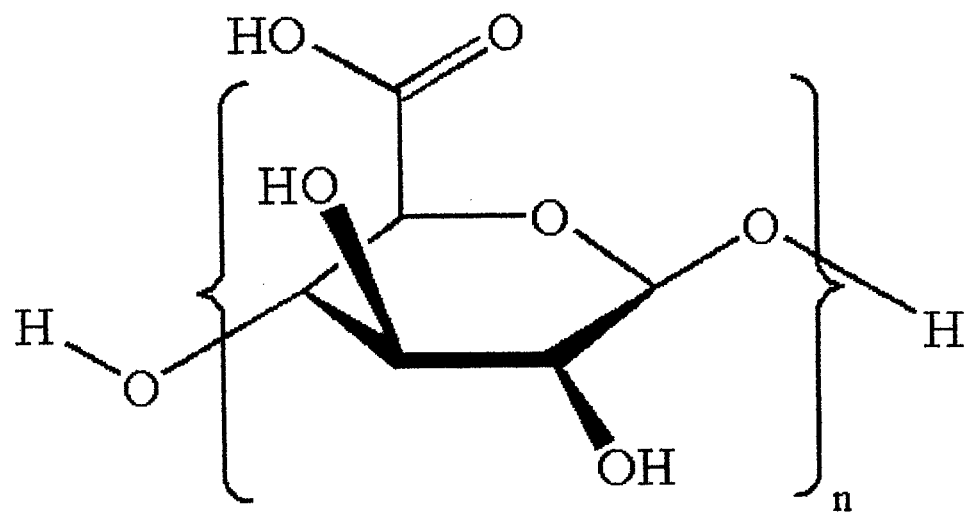
FIG. 5 is a representation of one embodiment of a unit of a carboxylated cellulose molecule.
Figure 6:
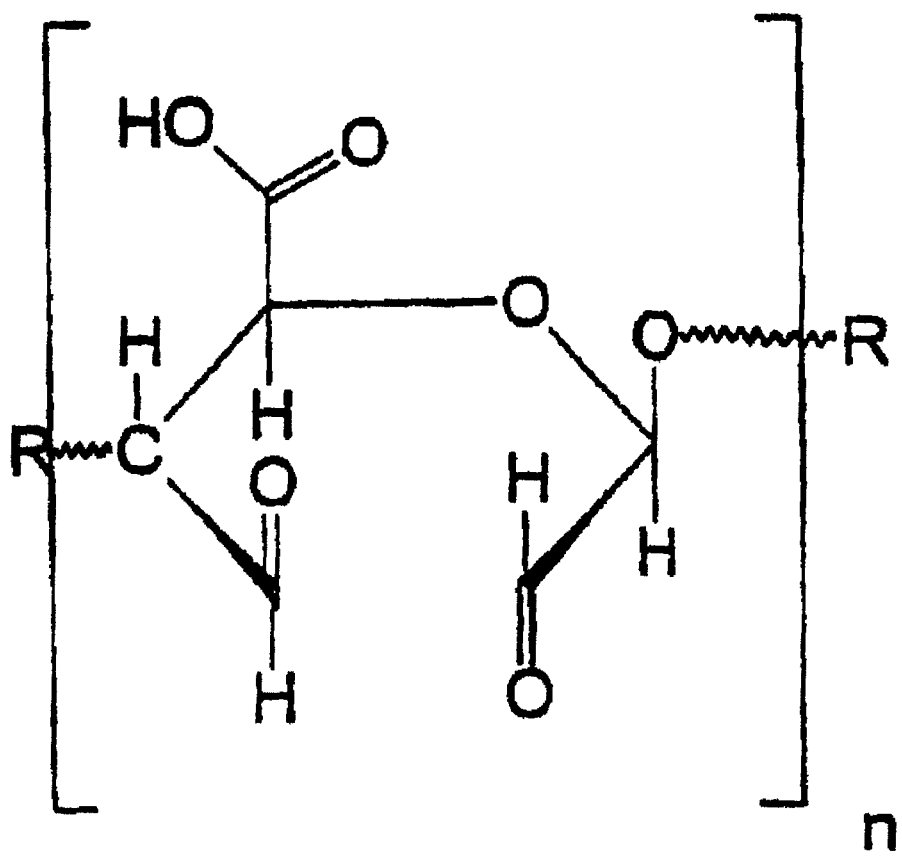
FIGS. 6 and 7 are representations of other embodiments of a unit of a carboxylated cellulose molecule.
Figure 7:
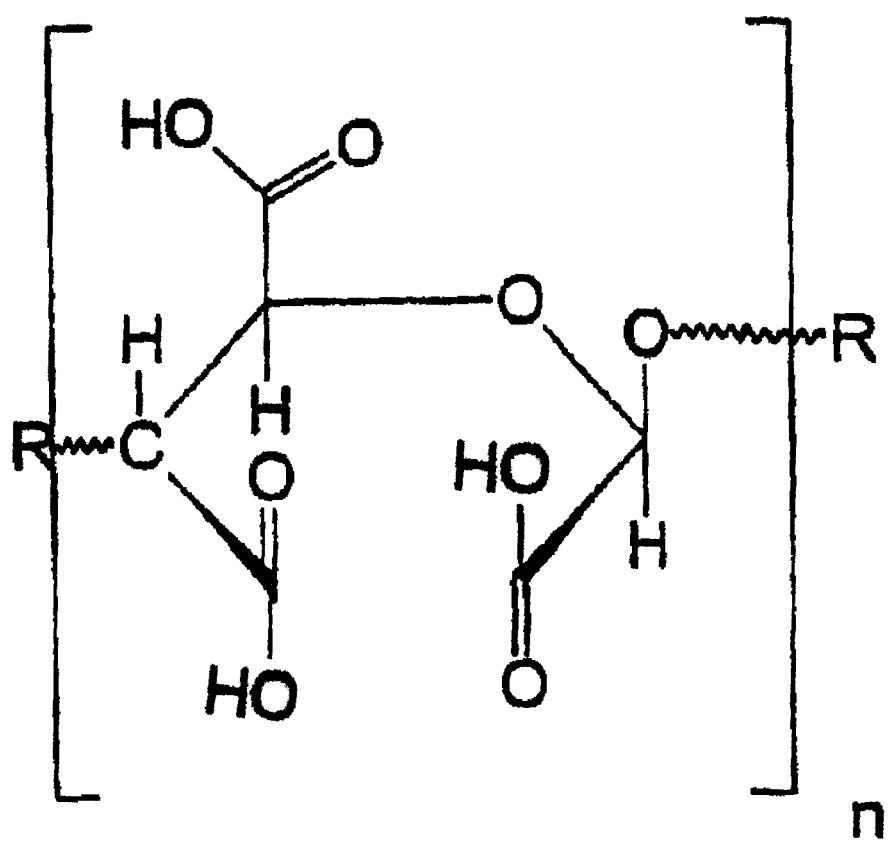

The carboxyl group in the carboxylated cellulose wood pulp fiber attaches at the 6 position of the anhydrous glucose unit. One structure of a carboxylated cellulose unit is shown in FIG. 5. It can be seen that the hydroxyl group at the 6 position of the anhydroglucose unit is converted to a carboxylic acid group. Another structure of a carboxylated cellulose unit is shown in FIG. 6. The bond between positions 2 and 3 has been broken and the hydroxyl groups at these positions are now oxygen groups. In FIG. 7 the unit is also carboxylated at positions 2 and 3.

Every anhydroglucose unit of the cellulose molecule chain is not carboxylated. The number of units that are carboxylated will determine the carboxyl content of the cellulose molecule and the carboxyl content of the cellulose fiber.

The carboxylated cellulose wood pulp fiber does not have side chains attached to the cellulose molecule through the carboxyl group.

The fiber is incorporated into cementitious materials. In one embodiment the carboxylated cellulose wood pulp fiber forms from 0.1 to 5% by weight of the weight of the cementitious material. The weight of the cementitious material is the weight on a dry basis of the cement and also of the silica fume in those mixes in which silica fume is used. In another embodiment the carboxylated cellulose wood pulp fiber forms from 0.5 to 3% by weight of the weight of the cementitious material. In another embodiment the carboxylated cellulose wood pulp fiber forms from 1 to 2% by weight of the weight of the cementitious material. In another embodiment the carboxylated cellulose wood pulp fiber forms from 0.1 to 1% by weight of the weight of the cementitious material. In another embodiment the carboxylated cellulose wood pulp fiber forms from 0.25 to 0.75% by weight of the weight of the cementitious material. In another embodiment the carboxylated cellulose wood pulp fiber forms from 0.4 to 0.6% by weight of the weight of the cementitious material.

The wood for the wood pulp fibers may be any softwood or hardwood such as pine, spruce, larch, Douglas fir, fir, hemlock, cedar, redwood, aspen, basswood, beech, birch, cottonwood, gum, maple, ash, chestnut, elm, or eucalyptus. It may be pulped by any standard pulping process such as kraft or sulfite. The wood pulp fiber is bleached by any standard bleaching process.

The fiber is pulped and bleached to remove hemicelluloses and lignin which can be deleterious to the curing of the cement.

The bleached cellulose wood pulp fiber is then carboxylated. The carboxylation method is disclosed in U.S. Pat. Nos. 6,379,494, 6,524,348 and 6,987,181. The cellulose fiber in an aqueous slurry or suspension is first oxidized by addition of a primary oxidizer comprising a cyclic nitroxide lacking any hydrogen substitution on either of the carbon atoms adjacent the nitroxide nitrogen. Nitroxides having both five and six membered rings have been found to be satisfactory. Both five and six membered rings may have either a methylene group or another heterocyclic atom selected from nitrogen, sulfur or oxygen at the four position in the ring, and both rings may have substituent groups at this location. It is important that the nitroxide chosen be stable in an aqueous alkaline environment in the range of about pH 8-11.

A large group of nitroxide compounds have been found to be suitable. 2,2,6,6-Tetramethylpiperidinyl-1-oxy free radical (TEMPO) is among the exemplary nitroxides found useful. Another suitable product linked in a mirror image relationship to TEMPO is 2,2,2'2',6,6,6',6'-octamethyl-4,4'-bipiperidinyl-1,1'-dioxy di-free radical (BI-TEMPO). Similarly, 2,2,6,6-tetramethyl-4-hydroxypiperidinyl-1-oxy free radical; 2,2,6,6-tetramethyl-4-methoxypiperidinyl-1-oxy free radical; and 2,2,6,6-tetramethyl-4-benzyloxypiperidinyl-1-oxy free radical; 2,2,6,6-tetramethyl-4-aminopiperidinyl-1-oxy free radical; 2,2,6,6-tetramethyl-4-acetylaminopiperidinyl-1-oxy free radical; and 2,2,6,6-tetramethyl-4-piperidone-1-oxy free radical are examples of compounds with substitution at the 4 position of TEMPO that have been found to be very satisfactory oxidants. Among the nitroxides with a second hetero atom in the ring at the four position (relative to the nitrogen atom), 3,3,5,5-tetramethyl-morpholine-1-oxy free radical (TEMMO) is very useful.

The nitroxides are not limited to those with saturated rings. One compound found to be a very effective oxidant is 3,4-dehydro-2,2,6,6-tetramethyl-piperidinyl-1-oxy free radical.

Six membered ring compounds with double substitution at the four position have been especially useful because of their relative ease of synthesis and lower cost. Exemplary among these are the ethylene, propylene, and neopentyl cyclic acetals of 2,2,6,6-tetramethyl-4-piperidone-1-oxy free radical.

Among the five membered ring products, 2,2,5,5-tetramethyl-pyrrolidinyl-1-oxy free radical has been found to be very effective.

The above named compounds should only be considered as exemplary among the many representatives of the nitroxides suitable for use.

The nitroxides may be formed in situ by oxidation of the hydroxylamines or their amine precursors. The nitroxide form is oxidized to the oxammonium salt by the secondary oxidant that is consumed. The oxammonium salt of the nitroxide is the primary oxidant that performs the oxidation of primary hydroxyl group on C-6 of the anhydroglucose moiety of cellulose, first to an aldehyde group and then to a carboxyl group. While the nitroxide is converted to an oxammonium salt then to a hydroxylamine during the oxidation reaction, it is continuously regenerated and converted to the oxammonium salt by the presence of a secondary oxidant. A water soluble hypohalite compound is a preferred secondary oxidant. Chlorine dioxide, or a latent source of chlorine dioxide, is also a preferred secondary oxidant. Since the nitroxide is not irreversibly consumed in the oxidation reaction only a small amount of it is required. During the course of the reaction it is the secondary oxidant which will be depleted. In one embodiment the amount of nitroxide required is in the range of about 0.005% to 1.0% based on cellulose present. In another embodiment the amount of nitroxide required is about 0.02-0.25%. The oxammonium salt of the nitroxide is known to preferentially oxidize the primary hydroxyl located on C-6 of the anhydroglucose moiety of cellulose.

The nitroxide may first be premixed with a portion of an aqueous hypohalite to form a homogeneous solution before addition to the cellulose fiber slurry. Ultrasonic agitation may be useful to increase dissolution rate. The oxidation reaction may be allowed to continue over a time period from about one minute to ten or more hours. In one embodiment the temperatures is from about 0 to 75° C. In another embodiment the temperature is about 0° to 30° C. In another embodiment the temperature is room temperature. Following the oxidation reaction, if maximum D.P. stability is desired, the cellulose is washed and reslurried in water where it is subjected to the action of a stabilizing reagent to convert substituent groups, such as aldehydes and ketones, to hydroxyl or carboxyl groups. Unstabilized nitroxide oxidized pulps have objectionable color reversion and will self crosslink upon drying, thereby reducing their ability to redisperse.

A preferred hypohalite is sodium hypochlorite (NaOCl). Sodium hypochlorite is inexpensive and readily available as a stable aqueous solution with about 4-10% NaOCl w/v. This can be made in situ by bubbling chlorine gas into a solution of NaOH. Admixture of NaOCl with sodium bromide (NaBr) will accelerate the oxidation reaction and the use of this combination is highly preferred. About 3 parts by weight NaBr to 4 parts of NaOCl has proved very satisfactory, although this ratio is not critical. The usage of NaOCl may be in the range of about 0.8-6.5 g/L of pulp slurry, preferably about 1.1-1.4 g/L. Usage of NaOCl based on cellulose will be within the range of about 0.5-35% by weight, preferably about 1.3-10.5% by weight. Exact usage will depend on the amount of carboxylation desired. The pH during oxidation should generally be maintained within the range of 8-11, preferably 9-10 and most preferably 9.5-9.8. The oxidation reaction will proceed at higher and lower pH values but at lower efficiencies.

A proprietary composition sold as Stabrex™, available from Nalco Chemical Co., Chicago, Ill., may be used in place of the hypochlorite oxidant. Stabrex is sold as an aqueous stabilized highly alkaline solution of a bromine-containing composition having 1-5% NaOH, a minimum pH of 13, and is a latent source of hypobromite. The composition contains a stabilizer which is believed to be a sulfonated nitrogen containing compound. The Stabrex is useful where environmental or other considerations might dictate against the use of chlorine based materials.

Chlorine dioxide is a preferred oxidant as an elemental chlorine free secondary oxidant. Chlorine dioxide is an efficient secondary oxidant for oxidation of the nitroxide to the primary oxidant, its oxammonium salt. Chlorine dioxide is also an oxidant for oxidation of hydroxylamines and precursor amines to their respective nitroxides. Aqueous sodium hydroxide, sodium carbonate, sodium bicarbonate are preferred as bases with chlorine dioxide for the catalytic carboxylation of cellulose using nitroxides, hydroxylamines or their precursor amines.

It will be understood that in accordance with usual reaction kinetics the oxidation will proceed at a higher rate with increased concentrations of oxidants and at higher temperatures. Reaction at lower temperatures; e.g., at 0°-10° C., is preferred from the standpoint of reducing cellulose D.P. degradation. However, the reaction may also be carried out at higher temperatures to produce products having a D.P. higher than 600.

Following oxidation, the cellulose is washed to remove any residual chemicals and may then be dried or further processed. If maximum stability and D.P. retention is desired the oxidized product is reslurried in water for treatment with a stabilizing agent. The stabilizing agent may either be a reducing agent or another oxidizing agent. A preferred reducing agent is preferably an alkali metal borohydride. Sodium borohydride ($NaBH_4$) is preferred from the standpoint of cost and availability. However, other borohydrides such as $LiBH_4$, or alkali metal cyanoborohydrides such as $NaBH_3$ CN are also suitable. $NaBH_4$ may be mixed with LiCl to form a very useful reducing agent. When $NaBH_4$ is used for reduction, it should be present in an amount between about 0.1 and 100 g/L. A more preferred amount would be about 0.25-5 g/L and a most preferred amount from about 0.5-2.0 g/L. Based on cellulose the amount of reducing agent should be in the range of about 0.1% to 4% by weight, preferably about 1-3%. Reduction may be carried out at room or higher temperature for a time between 10 minutes and 10 hours, preferably about 30 minutes to 2 hours.

Alkali metal chlorites are preferred oxidizing agents used as stabilizers, sodium chlorite being preferred because of the cost factor. Other compounds that may serve equally well as oxidizers are permanganates, chromic acid, bromine, and silver oxide. A combination of chlorine dioxide and hydrogen peroxide is also a suitable oxidizer when used at the pH range designated for sodium chlorite. Oxidation using sodium chlorite may be carried out at a pH in the range of about 1.5-5, preferably 2-4, at temperatures between about 25°-90° C. for times from about 5 minutes to 50 hours, preferably about 10 minutes to 2 hours. One factor that favors oxidants as opposed to reducing agents is that aldehyde groups on the oxidized cellulose are converted to additional carboxyl groups, thus resulting in a more highly carboxylated product. These stabilizing oxidizers are referred to as "tertiary oxidizers" to distinguish them from the nitroxide/hypochlorite primary/secondary oxidizers. The tertiary oxidizer is used in a molar ratio of about 1.0-15 times the presumed aldehyde content of the oxidized cellulose, preferably about 5-10 times. In a more convenient way of measuring the required tertiary oxidizer needed, the preferred sodium chlorite usage should fall within about 0.001 g sodium chlorite/g of fiber to 0.2 g/g, preferably 0.01-0.09 g/g, the chlorite being calculated on a 100% active material basis.

After stabilization is completed, the cellulose is again washed and may be dried if desired. Alternatively, the carboxyl substituents may be converted to other cationic forms beside hydrogen or sodium; e.g., calcium, magnesium, or ammonium.

The structures shown in FIGS. 6 and 7 may be made by periodate oxidation at positions 2 and 3, and additional oxidation at these positions.

One particular advantage of the process is that all reactions are carried out in an aqueous medium to yield a product in which the carboxylation is primarily located on the fiber surface. The product will have at least about 20% of the total carboxyl content on the fiber surface. This is in comparison with about 10% as is the case with untreated fiber.

The carboxylated wood pulp fibers are added to the water and cementitious mix.

Specific examples of cement-based materials that can be used include aluminous cement, blast furnace cement, calcium aluminate cement, Type I Portland cement, Type IA Portland cement, Type II Portland cement, Type IIA Portland cement, Type III Portland cement, Type IIIA, Type IV Portland cement, Type V Portland cement, hydraulic cement such as white cement, gray cement, blended hydraulic cement, Type IS-Portland blast-furnace slag cement, Type IP and Type P-Portland-pozzolan cement, Type S-slag cement, Type I (PMY pozzolan modified Portland cement, and Type I (SM)-slag modified Portland cement, Type GU-blended hydraulic cement, Type HE-high-early-strength cement, Type MS-moderate sulfate resistant cement, Type HS-high sulfate resistant cement, Type MH-moderate heat of hydration cement, Type LH-low heat of hydration cement, Type K expansive cement, Type O expansive cement, Type M expansive cement, Type S expansive cement, regulated set cement, very high early strength cement, high iron cement, and oil-well cement, further concrete fiber cement deposits and any composite material including any of the above listed cement.

The different types of cement can be characterized by The American Society for Testing and Materials (ASTM) Specification C-150. For example, Type I Portland cement is a general-purpose cement suitable for all uses. It is used in general construction projects such as buildings, bridges, floors, pavements, and other precast concrete products. Type IA Portland cement is similar to Type I with the addition of air-entraining properties. Type II Portland cement generates less heat, at a slower rate, and has a moderate resistance to sulfate attack. Type IIA Portland cement is identical to Type II with the addition of air-entraining properties. Type III Portland cement is a high-performance or high-early-strength cement and causes concrete to set and gain strength rapidly. Type III is chemically and physically similar to Type I, except that its particles have been ground finer. Type MA is an air-entraining, high-early-strength cement. Type IV Portland cement has a low heat of hydration and develops strength at a slower rate than other cement types, making it preferable for use in dams and other massive concrete structures where there is little chance for heat to escape. Type V Portland cement is used only in concrete structures that will be exposed to severe sulfate action, principally where concrete is exposed to soil and groundwater with a high sulfate content.

The fibers are useful in high performance concrete which have low amounts of water as compared to the cementitious mixture.

The cement-based material can include other components or fillers as known by those skilled in the art to which this disclosure pertains, such as those used to form various types of concretes. For example, the cement-based material can include aggregates, air-entraining agents, retarding agents, accelerating agents such as catalysts, plasticizers, corrosion inhibitors, alkali-silica reactivity reduction agents, bonding agents, colorants, and the like. "Aggregates" as used herein, unless otherwise stated, refer to granular materials such as sand, gravel, crushed stone or silica fume. Aggregates can be divided into fine aggregates and coarse aggregates. An example of fine aggregates includes natural sand, crushed stone or silica fume with most particles passing through a ⅜-inch (9.5-mm) sieve. An example of coarse aggregates includes particles greater than about 0.19 inch (4.75 mm), but generally range between about %-inch and about 1.5 inches (9.5 mm to 37.5 mm) in diameter, such as gravel. Aggregates such as natural gravel and sand can be dug or dredged from a pit, river, lake, or seabed. Crushed aggregate can be produced by crushing quarry rock, boulders, cobbles, or large-size gravel. Other examples of aggregate materials include recycled concrete, crushed slag, crushed iron ore, or expanded (i.e., heat-treated) clay, shale, or slate.

The carboxylated fibers can be added to the cementitious material by the following procedure:

(a) The fibers are mixed in water to disperse.

(b) Superplacticizer (SP) is added after the dispersion of fibers in water.

(c) The mix of water, fiber and SP is added to the cementitious material and allowed to soak in. The time is 30 seconds.

(d) The ingredients are mixed for at low speed. The time is dependent on the size of the batch. The time is a minimum of 1 minute and can be from 1 minute to 5 minutes.

(e) An additional amount of superplasticizer is added slowly to the mix, if necessary, to improve workability.

(f) The batch is mixed at high speed. Again, the time is dependent on the size of the mix. The time is a minimum of 1 minute and can be from 1 minute to 5 minutes.

(g) More superplasticizer is added slowly to the mix, if necessary, to further improve workability.

(h) The mix is rested for 30 seconds. (This step is optional.)

(i) The mix is further mixed at high speed for a minimum of 1 minute and can be from 1 minute to 5 minutes.

(j) More superplasticizer is added slowly to the mix, if necessary, to further improve workability.

An increase in the amount of fiber requires an increase in the amount of superplasticizer. The addition of fiber reduces the flow of the cementitious mix and superplasticizer is added to increase the flow. The more fiber that is added the greater the decrease in the flow and the more superplasticizer that is required to return the flow to normal. One way to decrease the amount of fiber that is required is to increase the amount of carboxylation on the fiber. A fiber addition of around 0.5% of the weight of the cementitious mix, 0.35 to 0.65% of the cementitious mix will minimize the amount of superplasticizer needed.

The fiber is providing carboxyl content to the cementitious mix. The carboxyl groups on the fiber are binding up and releasing the water in the cement in a controlled manner. In one embodiment from 20 to 600 meq carboxyl content per 100 kilograms of cementitious material is used (20-60 meq/100 g of fiber, 0.1-1% fiber in cement). In another embodiment 20 to 500 meq carboxyl content per 100 kilograms of cementitious material is used (20-50 meq/100 g of fiber, 0.1-1% fiber in cement). In another embodiment 20 to 400 meq carboxyl content is used (20-400 meq/100 g of fiber, 0.1-1% fiber in cement).

Less fiber is needed if the carboxyl content of the fiber is high. As an example, a fiber having a carboxyl content of 20 meq/100 g has half the carboxyl groups of a fiber having a carboxyl content of 40 meq/100 g and twice as much of the former fiber is needed to provide the same carboxyl content to the cementitious mixture.

The critical period in cement or concrete setting is the first seven days. Cracks occurring during the early setting period are detrimental to the long term durability of the cement or concrete.

The addition of the carboxylated fibers has no impact on compressive strength. Compressive strength trends remain the same.

In the following set of examples, There was a control (C) cement mix which did not include fiber, a cement mix which included a bleached Southern softwood kraft pulp fiber having a carboxyl content of about 25 meq/100 g (SSK), a cement mix which included a bleached northern softwood kraft pulp fiber having a carboxyl content of about 25 meq/100 g (NSK1) and a cement mix which included a bleached northern softwood kraft pulp fiber sample having a carboxyl content of about 10 meq/100 g (NSK2). These fibers were chosen because the natural bleached pulp fiber had a substantially uniform carboxyl level. Three fiber addition levels were used: 1% by weight of the weight of the cementitious mixture (1), 1.5% by weight of the weight of the cementitious mixture (1.5) and 2% by weight of the weight of the cementitious mixture (2).

The samples were mixed as described above.

There were two runs, one with cement alone and one with cement and silica fume. The information about the tests are given in Tables 1-3.

TABLE 1

Details of paste mix designs using:
treated Southern softwood kraft pulp [FR20] and 100% Portland cement Type I; or
a blend of Portland cement Type I and 10% silica fume.

| | Fiber | | | | | | | |
|---|---|---|---|---|---|---|---|---|
| | Control | SSK | | | Control | SSK | | |
| Fiber dosage % | 0 | 1 | 1.5 | 2 | 0 | 1 | 1.5 | 2 |
| fiber moisture content | — | 79.98 | 80.11 | 78.74 | — | 78.64 | 78.64 | 78.64 |
| K | — | 2.30 | 2.30 | 2.30 | — | 2.30 | 2.30 | 2.30 |
| Cement g | 100.00 | 100.00 | 100.00 | 100.00 | 90.00 | 90.00 | 90.00 | 90.00 |
| Silica fume g | — | — | — | — | 10.00 | 10.00 | 10.00 | 10.00 |
| water total g | 30.00 | 30.00 | 30.00 | 30.00 | 30.00 | 30.00 | 30.00 | 30.00 |
| water added g | 30.00 | 27.31 | 25.91 | 25.19 | 30.00 | 27.62 | 26.43 | 25.24 |
| fiber dry g | 0.00 | 1.00 | 1.50 | 2.00 | 0.00 | 1.00 | 1.50 | 2.00 |
| fiber as received g | 0.00 | 4.99 | 7.54 | 9.41 | 0.00 | 4.68 | 7.02 | 9.36 |
| super-plasticizer ml | 0.20 | 0.47 | 0.53 | 0.73 | 0.33 | 0.40 | 0.43 | 0.50 |
| w/cm | 0.30 | 0.30 | 0.30 | 0.30 | 0.30 | 0.30 | 0.30 | 0.30 |
| $w_e$/cm* | 0.00 | 0.023 | 0.023 | 0.023 | 0.00 | 0.023 | 0.023 | 0.023 |

*assuming that all water in fibers, given by k-value, will be available for internal curing.

TABLE 2

Details of paste mix designs using:
treated northern softwood kraft pulp 1 [GP20] and 100% Portland
cement Type I; or a blend of Portland cement Type I and 10% silica fume.

| | Fiber | | | | | | | |
|---|---|---|---|---|---|---|---|---|
| | Control | NSK1 | | | Control | NSK1 | | |
| Fiber dosage % | 0 | 1 | 1.5 | 2 | 0 | 1 | 1.5 | 2 |
| fiber moisture content | — | 76.31 | 76.82 | 76.82 | — | | | |
| K | — | 2.90 | 2.90 | 2.90 | — | 2.90 | 2.90 | 2.90 |
| Cement g | 100.00 | 100.00 | 100.00 | 100.00 | 90.00 | 90.00 | 90.00 | 90.00 |
| Silica fume g | — | — | — | — | 10.00 | 10.00 | 10.00 | 10.00 |
| water total g | 30.00 | 30.00 | 30.00 | 30.00 | 30.00 | 30.00 | 30.00 | 30.00 |
| water added g | 30.00 | 28.68 | 27.88 | 27.17 | 30.00 | 27.87 | 26.81 | 25.74 |
| fiber dry g | 0.00 | 1.00 | 1.50 | 2.00 | 0.00 | 1.00 | 1.50 | 2.00 |
| fiber as received g | 0.00 | 4.22 | 6.47 | 8.63 | 0.00 | 5.03 | 7.54 | 10.06 |
| super-plasticizer ml | 0.20 | 0.40 | 0.43 | 0.50 | 0.33 | 0.36 | 0.40 | 0.50 |
| w/cm | 0.30 | 0.30 | 0.30 | 0.30 | 0.30 | 0.30 | 0.30 | 0.30 |
| $w_e$/cm* | 0.00 | 0.029 | 0.029 | 0.029 | 0.00 | 0.029 | 0.029 | 0.029 |

*assuming that all water in fibers, given by k-value, will be available for internal curing.

TABLE 3

Details of paste mix designs using:
treated northern softwood kraft pulp 2 [GP5] and 100% Portland cement Type I; or
a blend of Portland cement Type I and 10% silica fume.

| | Fiber | | | | | | | |
|---|---|---|---|---|---|---|---|---|
| | Control | NSK2 | | | Control | NSK2 | | |
| Fiber dosage % | 0 | 1 | 1.5 | 2 | 0 | 1 | 1.5 | 2 |
| fiber moisture content | — | 75.75 | 76.00 | 76.00 | — | 73.80 | 73.80 | 73.80 |
| K | — | 3.10 | 3.10 | 3.10 | — | 3.10 | 3.10 | 3.10 |
| Cement g | 100.00 | 100.00 | 100.00 | 100.00 | 90.00 | 90.00 | 90.00 | 90.00 |
| Silica fume g | — | — | — | — | 10.00 | 10.00 | 10.00 | 10.00 |
| water total g | 30.00 | 30.00 | 30.00 | 30.00 | 30.00 | 30.00 | 30.00 | 30.00 |
| water added g | 30.00 | 27.98 | 28.40 | 27.87 | 30.00 | 29.28 | 28.92 | 28.57 |
| fiber dry g | 0.00 | 1.00 | 1.50 | 2.00 | 0.00 | 1.00 | 1.50 | 2.00 |
| fiber as received g | 0.00 | 4.12 | 6.25 | 8.33 | 0.00 | 3.82 | 7.63 | 5.73 |
| super-plasticizer ml | 0.20 | 0.33 | 0.40 | 0.50 | 0.33 | 0.33 | 0.36 | 0.40 |
| w/cm | 0.30 | 0.30 | 0.30 | 0.30 | 0.30 | 0.30 | 0.30 | 0.30 |
| $w_e$/cm* | 0.00 | 0.031 | 0.031 | 0.031 | 0.00 | 0.031 | 0.031 | 0.031 |

*assuming that all water in fibers, given by k-value, will be available for internal curing.

Set Time

Set time following *ASTM C191 Standard Test Methods for Time of Setting of Hydraulic Cement by Vicat Needle*. Periodic penetration tests are performed on the paste mixes by allowing a 1 mm Vicat needle to settle into the paste. The initial or normal consistency is the depth of penetration of the needle in the initial mix. The maximum depth that can be determined is 40 mm According to ASTM C150/C150M the initial consistency should be 10±1 mm The Vicat initial time of setting is the time when the penetration is measured or calculated to be 25 mm The Vicat final time of setting is the time elapsed between initial contact of cement and water and the time when the needle does not leave a complete circular impression in the paste surface. According to ASTM C150/C150M the specification limits for initial set time for Portland cement paste ranges between 45 and 375 minutes. There is not ASTM time for final set type but it is typically 300 minutes In the following tests, superplasticizer was added to maintain mix workability. The controls were treated with varying amounts of superplasticizer to determine initial consistency. The silica fume tests used 90 weight % cement and 10 weight % silica fume.

TABLE 4

Set times

| Fiber | Silica fume % | % fiber | Super-plasticizer ml | Initial consistency mm | Initial set time minutes | Final set time minutes |
|---|---|---|---|---|---|---|
| Control | 0 | 0 | 0 | 25.00 | 145 | 225 |
| Control | 0 | 0 | 0.20 | 33.50 | 225 | 302 |
| Control | 0 | 0 | 0.47 | 40.00 | 333 | 444 |
| Control | 0 | 0 | 0.73 | 40.00 | 455 | 660 |
| SSK | 0 | 1 | 0.47 | 8.00 | 301 | 481 |
| SSK | 0 | 1.5 | 0.53 | 5.00 | 342 | 587 |
| SSK | 0 | 2 | 0.73 | 5.00 | 293 | 880 |
| NSK1 | 0 | 1 | 0.40 | 9.00 | 235 | 475 |
| NSK1 | 0 | 1.5 | 0.43 | 7.00 | 110 | 505 |
| NSK1 | 0 | 2 | 0.50 | 5.00 | 26 | 560 |
| NSK2 | 0 | 1 | 0.33 | 7.00 | 127 | 486 |
| NSK2 | 0 | 1.5 | 0.40 | 6.00 | 46 | 489 |
| NSK2 | 0 | 2 | 0.50 | 3.00 | 54 | 565 |
| Control | 10 | 0 | 0 | 5.00 | 156 | 344 |
| Control | 10 | 0 | 0.33 | 39.50 | 237 | 376 |
| Control | 10 | 0 | 0.40 | 40.00 | 265 | 468 |
| Control | 10 | 0 | 0.50 | 40.00 | 307 | 482 |
| SSK | 10 | 1 | 0.40 | 15.00 | 237 | 474 |
| SSK | 10 | 1.5 | 0.43 | 10.00 | 278 | 488 |
| SSK | 10 | 2 | 0.50 | 5.00 | 280 | 580 |
| NSK1 | 10 | 1 | 0.36 | 5.50 | 180 | 288 |
| NSK1 | 10 | 1.5 | 0.40 | 4.00 | 81 | 308 |
| NSK1 | 10 | 2 | 0.50 | 3.00 | 93 | 350 |
| NSK2 | 10 | 1 | 0.33 | 6.00 | 174 | 343 |
| NSK2 | 10 | 1.5 | 0.36 | 6.00 | 98 | 355 |
| NSK2 | 10 | 2 | 0.40 | 4.00 | 78 | 396 |

Autogenous Shrinkage Test

Autogenous deformation was measured as described by O. M. Jensen and P. F. Hansen in "*A dilatometer for measuring autogenous shrinkage deformation in hardening cement paste*", Materials and Structures, 1995, 28(181):406-409. Specimens were weighed and sealed in corrugated polyethylene tubes and stored at ambient temperature. Autogenous linear deformation measurements were monitored continuously and recorded for 14 days. The initial measurement was taken at final set time measured by ASTM C191 for each mix. Three (3) specimens were tested for each mix. Table 5 gives the results.

TABLE 5

Autogenous shrikage

| Fiber | Fiber addition % | Length change (microstrain) | Reduction in autogenous shrinkage % |
|---|---|---|---|
| Control | 0 | −1037 | — |
| SSK | 1 | −627 | 40 |
| SSK | 1.5 | −294 | 72 |
| SSK | 2 | −79 | 92 |
| NSK1 | 1 | −664 | 36 |
| NSK1 | 1.5 | −256 | 75 |
| NSK1 | 2 | −22 | 98 |
| NSK2 | 1 | −647 | 38 |
| NSK2 | 1.5 | −309 | 70 |
| NSK2 | 2 | −183 | 93 |

The inclusion of the carboxylated fibers reduced the shrinkage greatly.

In the following set of examples, there were four cement mix controls and three cement mixes in which the carboxylated fibers were used. Two of the controls, M1 and M3, were cement mixes which had no fibers or other curing agent. One of the controls, M2, was a cement mix which had presoaked lightweight aggregates (PLWA), an industry standard for curing cement or concrete. One of the controls, M7, was a cement mix which contained Buckeye UltraFiber® 500 (U500). The U500 control was at a dosage rate comparable to the dosage rates of the fibers being tested and may not have been at the dosage rate suggested by Buckeye. One of the examples, M4, was a cement mix which included GP5, a bleached northern softwood pulp fiber having a carboxyl content of about 10 meq/100 g, One of the examples, M5, was a cement mix which included GP20, a bleached northern softwood pulp fiber having a carboxyl content of 25 to 30 meq/100 g, One of the examples, M6, was a cement mix which included CM, a chemically intrafiber crosslinked bleached southern softwood pulp fiber having a carboxyl content of about 22 meq/100 g, Two water-to-cementitious material ratios (w/cm) were used, 0.30 and 0.40.

Table 6 discloses the fiber and water dosage rates:

TABLE 6

| | Fiber type | | | | Fiber dosage (%) | | | w/cm | | |
|---|---|---|---|---|---|---|---|---|---|---|
| Ex. | GP5 | GP20 | CM | U500 | 0 | 0.5 | 1 | 0.3 | 0.4 | PLWA |
| M1 | — | — | — | — | X | — | — | X | — | — |
| M2 | — | — | — | — | X | — | — | X | — | X |
| M3 | — | — | — | — | X | — | — | — | X | — |
| M4 | X | — | — | — | — | X | — | X | — | — |
| M5 | — | X | — | — | — | X | — | X | — | — |
| M6 | — | — | X | — | — | X | — | X | — | — |
| M7 | — | — | — | X | — | X | — | X | — | — |
| M8 | X | — | — | — | — | — | X | X | — | — |

The mortar mixes included a blend of Portland cement type 1 and 10% silica fume (SF). It also included sand.

(a) The mixing procedure was as follows:

(b) The test fibers were mixed in water to disperse.

(c) Superplasticizer was added after the dispersion of fibers in water.

(d) The mix of water, fiber and superplasticizer was added to the cementitious material and allowed to soak for 30 seconds.

(f) The batch was mixed at slow speed for 1 minute. Sand was added while mixing. The UltraFiber 500 fiber in M7 was added at this time. More superplasticizer was added, if necessary, to improve workability.

(g) The batch was mixed at medium speed for at least 1 minute. More superplasticizer was added, if necessary, to improve workability.

(h) Flow was measured.

(i) The batch was mixed further at medium speed for 1 minute. More superplasticizer was added, if necessary, to improve workability.

The mix was vibrated and tamped into the molds while filling the molds for the autogenous shrinkage samples and tamped as per ASTM C109 requirements for the compression cubes.

Figure 1:
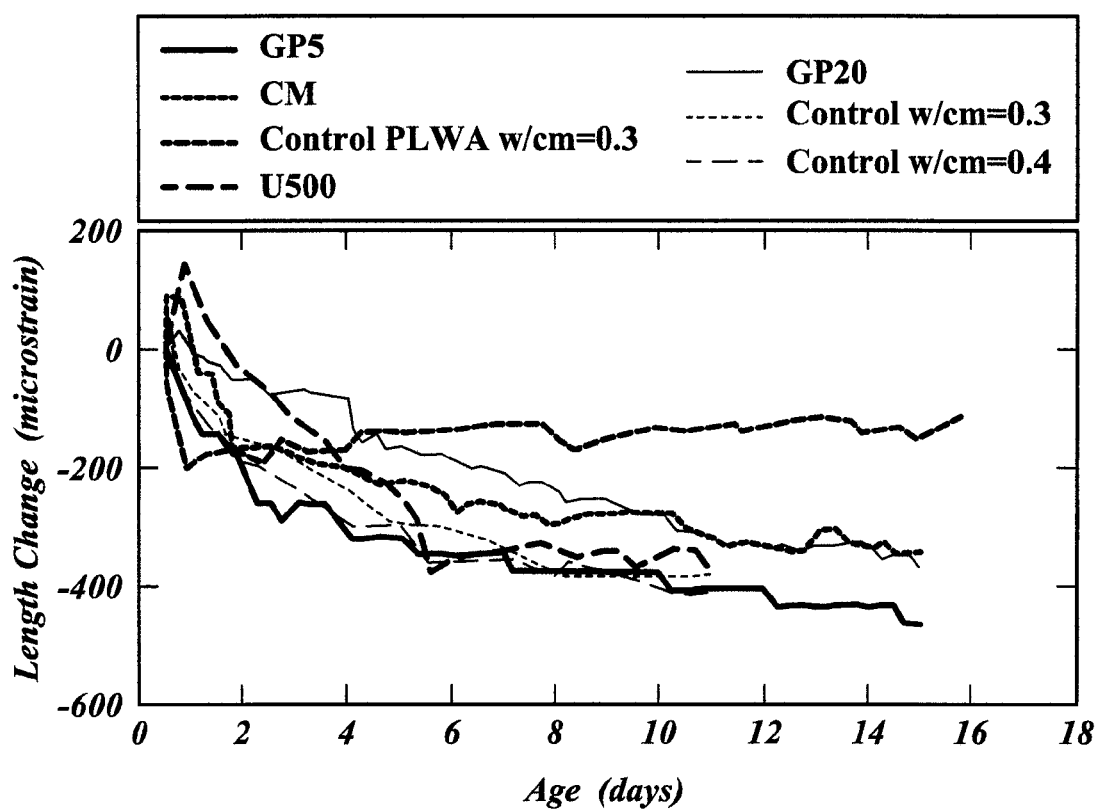
FIG. 1 is a graph showing age vs. length change for a number of cementitious mixtures.

The autogenous shrinkage of the different mixes was measured over time. The results are shown in FIG. 1. It was noted that the autogenous shrinkage for GP20 and CM was less than for GP5 which had less carboxylation than the others. GP5 and U500 were similar to the two controls, M1 and M3, which did not have either fiber or PLWA.

Figure 2:
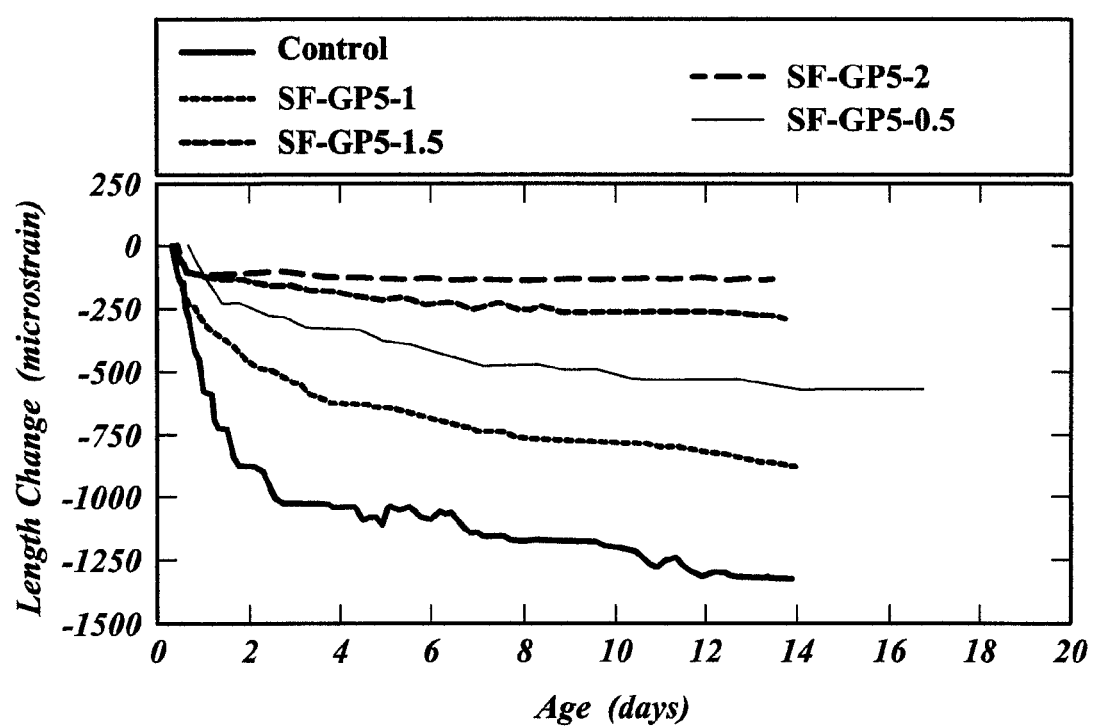
FIG. 2 is a graph showing age and dosage rate vs. length change.

The effect of different addition of GP5 on autogenous shrinkage was also tried. The addition rates were 0.5%, 1%, 1.5% and 2% of the weight of the cementitious mixture. The results are shown in FIG. 2. The effect of a 2% addition of GP5 was similar to the PLWA addition in FIG. 1. A 2% fiber addition requires a large amount of superplasticizer. The goal would be to use 0.5% addition of fiber with the same amount of carboxyl groups as is in the 2% fiber addition. This would mean using a fiber having a carboxyl content of 40 meq/100 g or more of carboxyl groups.

It is possible to make fibers having carboxyl content of 40 meq/100 g or more. It is expected the autogenous shrinkage of a fiber having a carboxyl content of 40 meq/100 g or more will have an autogenous shrinkage similar to the 2% addition of GP5.

Figure 3:
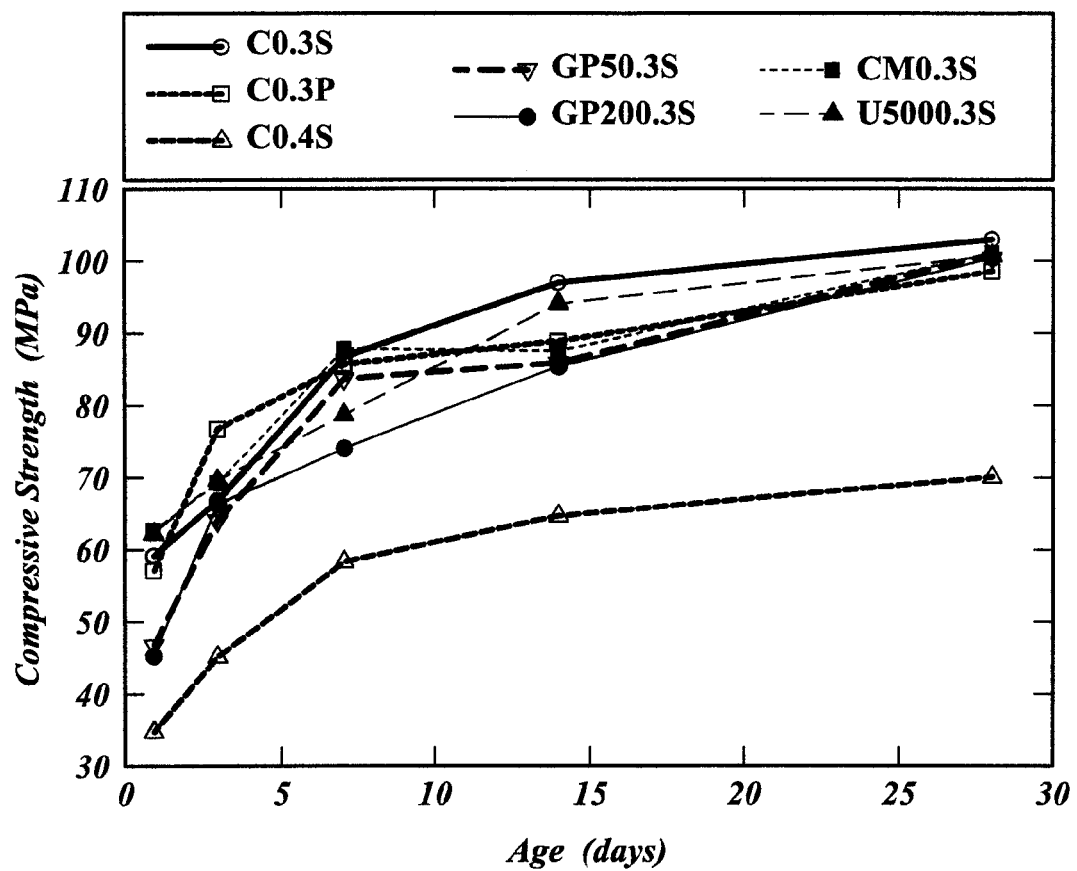
FIG. 3 is a graph showing age vs. compressive strength for a number of cementitious mixtures.

The compressive strength of the fiber addition was also determined FIG. 3 shows the results. The addition of fibers had not impact on compressive strength.

Although preferred embodiments of the invention have been described using specific terms, such description is for illustrative purposes only. The words used are words of description rather than of limitation. It is to be understood that changes and variations may be made by those of ordinary skill in the art without departing from the spirit or scope of the present invention, which is set forth in the following claims. The spirit and scope of the appended claims should not be limited to the description of the preferred versions contained herein.

The invention claimed is:

1. A method of curing cement to reduce autogenous shrinkage comprising:
   providing a mixture comprising cementitious material, water and carboxylated bleached wood pulp fiber;
   allowing the mixture to cure;
   the cementitious material comprises cement;
   the carboxylated fibers have a carboxyl content of 10 to 70 meq/100 g of cellulose fiber;
   the carboxylated fibers are 0.1 to 5% by weight of the dry weight of the cementitious material;
   the carboxylated fibers are made by the oxidation process and stabilized to convert aldehyde groups to carboxyl groups; and,
   the water to cement material ratio is a high performance concrete ratio.

2. The method of claim 1, wherein the fibers have a carboxyl content of 20 to 60 meq/100 g of cellulose fiber.

3. The method of claim 1, wherein the fibers have a carboxyl content of 30 to 50 meq/100 g of cellulose fiber.

4. The method of claim 1, wherein the fibers are 025 to 0.75% by weight of the dry weight of the cementitious material.

5. The method of claim 1, wherein the cementitious material further comprises aggregate material.

6. The method of claim 5, wherein the fibers have a carboxyl content of 20 to 60 meq/100 g of cellulose fiber.

7. The cementitious structure of claim 5 wherein the fibers have, a carboxyl content of 30 to 50 meq/100 g of cellulose fiber.

8. The cementitious structure of claim 5, wherein the fibers have a carboxyl content of 35 to 45 meq/100 g of cellulose fiber.

9. The method of claim 5, wherein the fibers are 0.25 to 0.75 by weight of the dry weight of the cementitious material.

10. A method of reducing the autogenous shrinkage of cement or concrete comprising:
    providing a mixture comprising cementitious material, water and carboxylated bleached wood pulp fiber;
    allowing the mixture to cure;
    the carboxylated fibers have a carboxyl content of 10 to 70 meq/100 g of cellulose fiber;
    the carboxylated fibers are 0.1 to 5% by weight of the dry weight of the cementitious material;
    the carboxylated fibers are made by the oxidation process and stabilized to convert aldehyde groups to carboxyl groups; and
    the water to cement material ratio is a high performance concrete ratio.

* * * * *